(12) United States Patent
Yiu et al.

(10) Patent No.: US 11,172,389 B2
(45) Date of Patent: Nov. 9, 2021

(54) MEASUREMENT GAP CONFIGURATION

(71) Applicant: Intel IP Corporation, Santa Clara, CA (US)

(72) Inventors: Candy Yiu, Portland, OR (US); Wenting Chang, Beijing (CN); Yuan Zhu, Beijing (CN); Yujian Zhang, Beijing (CN); Yushu Zhang, Beijing (CN); Yang Tang, San Jose, CA (US); Rui Huang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/078,497

(22) PCT Filed: Jul. 28, 2016

(86) PCT No.: PCT/CN2016/092003
§ 371 (c)(1),
(2) Date: Aug. 21, 2018

(87) PCT Pub. No.: WO2017/166549
PCT Pub. Date: Oct. 5, 2017

(65) Prior Publication Data
US 2019/0098524 A1    Mar. 28, 2019

Related U.S. Application Data

(60) Provisional application No. 62/316,294, filed on Mar. 31, 2016.

(51) Int. Cl.
*H04W 24/10* (2009.01)
*H04W 76/28* (2018.01)
(Continued)

(52) U.S. Cl.
CPC ......... *H04W 24/10* (2013.01); *H04L 41/0806* (2013.01); *H04W 16/28* (2013.01); *H04W 76/27* (2018.02); *H04W 76/28* (2018.02)

(58) Field of Classification Search
CPC ..... H04W 24/10; H04W 76/28; H04W 76/27; H04W 16/28; H04L 41/0806
See application file for complete search history.

(56) References Cited

U.S. PATENT DOCUMENTS

| 8,923,234 B2 | 12/2014 | Park et al. | |
| 2001/0006515 A1* | 7/2001 | Lee | H04W 36/0085 370/331 |

(Continued)

FOREIGN PATENT DOCUMENTS

| CN | 101730135 A | 6/2010 |
| EP | 2765798 A1 | 8/2014 |
| WO | 2017166549 A1 | 10/2017 |

OTHER PUBLICATIONS

International Search Report and Written Opinion received for International Application No. PCT/CN2016/092003, dated Jan. 11, 2017, 13 pages.

(Continued)

*Primary Examiner* — Gregory B Sefcheck
*Assistant Examiner* — Joshua Smith
(74) *Attorney, Agent, or Firm* — Spectrum IP Law Group LLC

(57) ABSTRACT

Apparatus, systems, and methods for measurement gap configuration in communication systems are described.

18 Claims, 11 Drawing Sheets

(51) Int. Cl.
 *H04W 76/27* (2018.01)
 *H04L 12/24* (2006.01)
 *H04W 16/28* (2009.01)

(56) References Cited

U.S. PATENT DOCUMENTS

| | | | | |
|---|---|---|---|---|
| 2008/0189970 A1* | 8/2008 | Wang | ............... | H04W 36/0055 33/701 |
| 2010/0322209 A1* | 12/2010 | Mizuno | ............... | H04W 72/082 370/336 |
| 2012/0178465 A1* | 7/2012 | Lin | ............... | H04W 24/10 455/450 |
| 2013/0272156 A1* | 10/2013 | Webb | ............... | H04W 4/70 370/252 |
| 2014/0341192 A1* | 11/2014 | Venkob | ............... | H04W 52/0229 370/336 |
| 2015/0063323 A1* | 3/2015 | Sadek | ............... | H04W 72/1215 370/336 |
| 2015/0098416 A1* | 4/2015 | Kuo | ............... | H04W 72/04 370/329 |
| 2015/0188793 A1* | 7/2015 | Zhao | ............... | H04L 5/1469 370/242 |
| 2015/0327103 A1* | 11/2015 | Tang | ............... | H04W 24/10 370/252 |
| 2016/0044730 A1* | 2/2016 | Baghel | ............... | H04W 4/021 370/329 |
| 2016/0337916 A1* | 11/2016 | Deenoo | ............... | H04W 36/0088 |
| 2017/0041880 A1* | 2/2017 | Ouchi | ............... | H04W 16/32 |
| 2017/0134976 A1* | 5/2017 | Uchino | ............... | H04W 72/0453 |
| 2017/0295568 A1* | 10/2017 | Takeda | ............... | H04W 52/30 |
| 2017/0311230 A1* | 10/2017 | Yang | ............... | H04W 72/0453 |
| 2017/0367045 A1* | 12/2017 | Rahman | ............... | H04W 52/0216 |
| 2018/0049055 A1* | 2/2018 | Wiberg | ............... | H04W 24/10 |

OTHER PUBLICATIONS

International Preliminary Report on Patentability received for International Application No. PCT/CN2016/092003, dated Oct. 11, 2018, 7 pages.

* cited by examiner

MeasGapConfig-Rxx information element

```
-- ASN1START

MeasGapConfig-Rxx ::=    CHOICE {
    release                  NULL,
    setup                    SEQUENCE {
        MeasGapList-Rxx      SEQUENCE (SIZE (1..maxMeasGap)) OF MeasGaps-Rxx
    }
}

MeasGaps-Rxx ::=         SEQUENCE {
    TP_ID                    INTEGER (0..maxID),
    gapOffset                CHOICE {
        gp0                      INTEGER (0..39),
        gp1                      INTEGER (0..79),
        ...
    }
}

-- ASN1STOP
```

FIG. 8

MEASUREMENT GAP CONFIGURATION

RELATED APPLICATIONS

This application is the national stage application of International Application No. PCT/CN2016/092003 filed Jul. 28, 2016, entitled MEASUREMENT GAP CONFIGURATION which in turn claims the benefit of priority under 35 U.S.C. § 119(e) of U.S. Provisional Application Ser. No. 62/316,294, filed Mar. 31, 2016 entitled "Measurement for 5G RAT in sync and asynchronized network," the disclosure of which is incorporated herein by reference in its entirety. Said Application No. PCT/CN2016/092003 and said Application No. 62/316,294 are hereby incorporated herein in their entireties.

FIELD

The present disclosure generally relates to the field of electronic communication. More particularly, aspects generally relate to measurement gap configuration in communication systems.

BACKGROUND

Techniques to implement measurement gap configuration may find utility, e.g., in electronic communication systems for electronic devices.

BRIEF DESCRIPTION OF THE DRAWINGS

The detailed description is provided with reference to the accompanying figures. The use of the same reference numbers in different figures indicates similar or identical items.

FIG. 8 is an example of a measurement gap configuration information element in accordance with various examples discussed herein.

Figure 1:
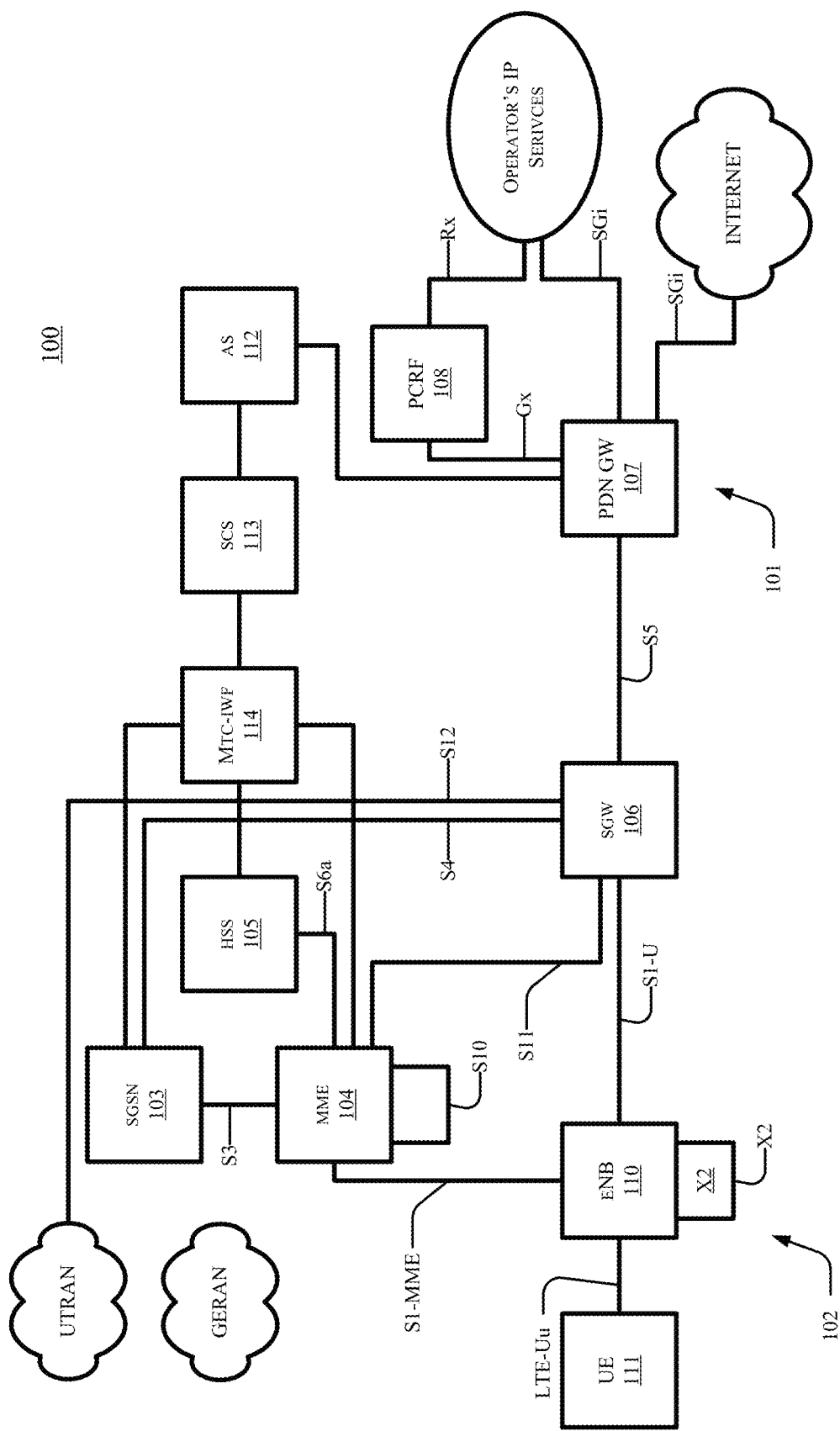
FIG. 1 is a schematic, block diagram illustration of components in a 3GPP LTE network which may implement measuremenet gap configuration in communication systems in accordance with various examples discussed herein.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following description, numerous specific details are set forth in order to provide a thorough understanding of various examples. However, various examples may be practiced without the specific details. In other instances, well-known methods, procedures, components, and circuits have not been described in detail so as not to obscure the particular examples. Further, various aspects of examples may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

Features and characteristics of techniques to implement a measurement gap configuration in communication systems, and communication systems in which the techniques may be incorporated are described below with reference to FIGS. 1-14.

FIG. 1 shows an exemplary block diagram of the overall architecture of a 3GPP LTE network 100 that includes one or more devices that are capable of implementing methods to implement a downlink control information (DCI) configuration in communication systems according to the subject matter disclosed herein. FIG. 1 also generally shows exemplary network elements and exemplary standardized interfaces. At a high level, network 100 comprises a core network (CN) 101 (also referred to as an evolved Packet System (EPS)), and an air-interface access network E UTRAN 102. CN 101 is responsible for the overall control of the various User Equipment (UE) connected to the network and establishment of the bearers. CN 101 may include functional entities, such as a home agent and/or an ANDSF server or entity, although not explicitly depicted. E UTRAN 102 is responsible for radio-related functions.

The main exemplary logical nodes of CN 101 include, but are not limited to, a Serving GPRS Support Node (SGSN) 103, the Mobility Management Entity (MME) 104, a Home Subscriber Server (HSS) 105, a Serving Gate (SGW) 106, a packet data network (PDN) Gateway 107 and a Policy and Charging Rules Function (PCRF) Manager 108. The functionality of each of the network elements of CN 101 is well known and is not described herein. Each of the network elements of CN 101 are interconnected by well-known exemplary standardized interfaces, some of which are indicated in FIG. 1, such as interfaces S3, S4, S5, etc., although not described herein.

While CN 101 includes many logical nodes, the E UTRAN access network 102 is formed by at least one node, such as evolved NodeB (base station (BS), eNB or eNodeB) 110, which connects to one or more User Equipment (UE) 111, of which only one is depicted in FIG. 1. UE 111 is also referred to herein as a wireless device (WD) and/or a subscriber station (SS), and can include an M2M-type device. In one example, UE 111 may be coupled to eNB by an LTE-Uu interface. In one exemplary configuration, a single cell of an E UTRAN access network 102 provides one substantially localized geographical transmission point (having multiple antenna devices) that provides access to one or more UEs. In another exemplary configuration, a single cell of an E UTRAN access network 102 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 104 by an S1 MME interface and to SGW 106 by an S1 U interface. The protocols that run between the eNBs and the UEs are generally referred to as the "AS protocols." Details of the various interfaces are well known and not described herein.

The eNB 110 hosts the PHYsical (PHY), Medium Access Control (MAC), Radio Link Control (RLC), and Packet Data Control Protocol (PDCP) layers, which are not shown in FIG. 1, and which include the functionality of user-plane header-compression and encryption. The eNB 110 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 110 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 111, generates pages for UEs 111 over the air, broadcasts system information, controls UE measurement reporting, such as the periodicity of Channel Quality Information (CQI) reports, and allocates cell-level temporary identifiers to active UEs 111. The RRC layer also executes transfer of UE context from a source eNB to a target eNB during handover, and provides integrity protection for RRC messages. Additionally, the RRC layer is responsible for the setting up and maintenance of radio bearers.

Figure 2:
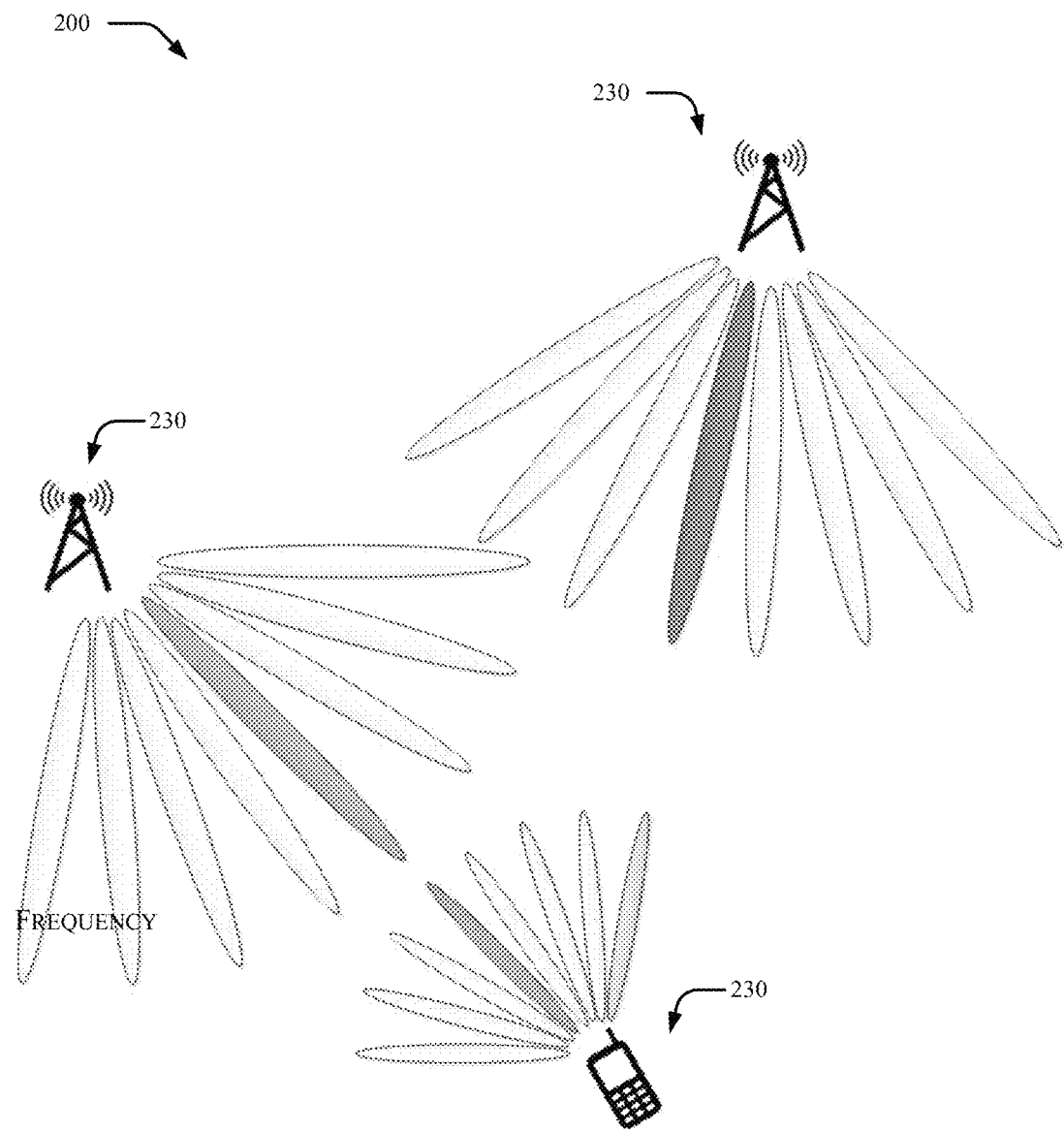
FIG. 2 is a schematic illustration of a network architecture in which measurement gap configuration may be implemented in accordance with various examples discussed herein.

Referring to FIG. 2, in some examples DCI grant can be utilized to configure various assignment related parameters, e.g., resource allocation, modulation and coding scheme, etc. In this way, the OFDM symbol for DCI can be saved for higher spectrum efficiency, and the complexity of DCI detection at a UE may be reduced.

Due to TX beam and RX beam mismatches and/or abrupt environment change, the DCI may fail to be received at the UE, in which case the UE cannot receive the payload within assigned multiple subframes, resulting in substantial resource waste. Further, if additional DCI, e.g., uplink grant DCI, may be configured during the multiple subframes, then the UE has to blindly detect the additional DCI which cause higher computation complexity.

In some examples the subject matter described herein addresses these and other problems by providing a backward-assigned alternative DCI transmission. In alternate examples a fully-assigned alternative DCI transmission may be implemented. Additional DCI indicators may be configured.

FIG. 2 is a schematic illustration of a network architecture for a communication system 200 which may implement a network initiated packet data network connection in accordance with various examples discussed herein. System 200 may comprise one or more cells, each of which may comprise one or more sectors. Each cell comprises at least one base station (BS 230. A plurality of UEs 210 may be located throughout system 200.

A base station 210 can be embodied as, but is not limited to, an evolved NodeB (eNB or eNodeB), a macro-cell base station, a pico-cell base station, a femto-cell base station, or the like. A UE 220 can embodied as, but is not limited to, a mobile station (MS), a subscriber station (SS), a Machine-to-Machine-type (M2M-type) device, customer premises equipment (CPE), a User Equipment (UE), a notebook-type computer, a tablet-type device, a cellular telephone, a smart-type device, a smartphone, a personal digital assistant, an information-handling system, or the like as described herein.

In some examples the base station(s) 230 and/or the UE(s) 210 may utilize beamforming techniques to compensate for path losses associated with high-frequency (e.g., mmWave) transmission protocols. In the example depicted in FIG. 2 both base station(s) 230 and the UE(s) 210 utilize eight different transmit beams, although one skilled in the art will recognize that a different number of transmit beams may be utilized.

When the communication system 200 operates in an asynchronous fashion, the UE(s) 210 can not perform measurement for intra-frequency beams/cells during normal data transmission. Therefore, a measurement gap is needed for intra-frequency beams/cells. In addition, since a timing offset is required for different beams/cells, more than one measurement gap is required. One solution is to configure one measurement configuration per beam/cell. Various techniques to configure a measurement gap are described herein.

As used herein, the phrase "measurement gap" refers to a time period in which a network element such as an eNB or another transmission point (TP) ceases transmitting and receiving. During the measurement gap a UE can switch from the eNB or other TP that is currently servicing the UE to a different eNB or TP and perform one or more signal quality measurements, then return to the eNB or TP serving the UE. This requires an established agreement between UE and the eNB about measurement gap definition parameters (e.g., Starting Position of the Gap, Gap length, number of Gaps etc). In some examples measurement gap definition is established by a MeasGapConfig information element (IE) of a radio resource control (RRC) Connection Reconfiguration message.

FIGS. 3-6 are examples of measurement gap configurations in accordance with various examples discussed herein. In the examples depicted in FIGS. 3-6 the communication system comprises a service transmission point (TP) and four additional transmission points (TPs) which operate in an asynchronous fashion. In some examples the transmission points (TPs) may be embodied as different eNBs serving different cells in a cellular network. In other examples the transmission points (TPs) may be implemented as wireless network access points, e.g., a pico-cell base station, a femto-cell base station, or the like.

Figure 3:
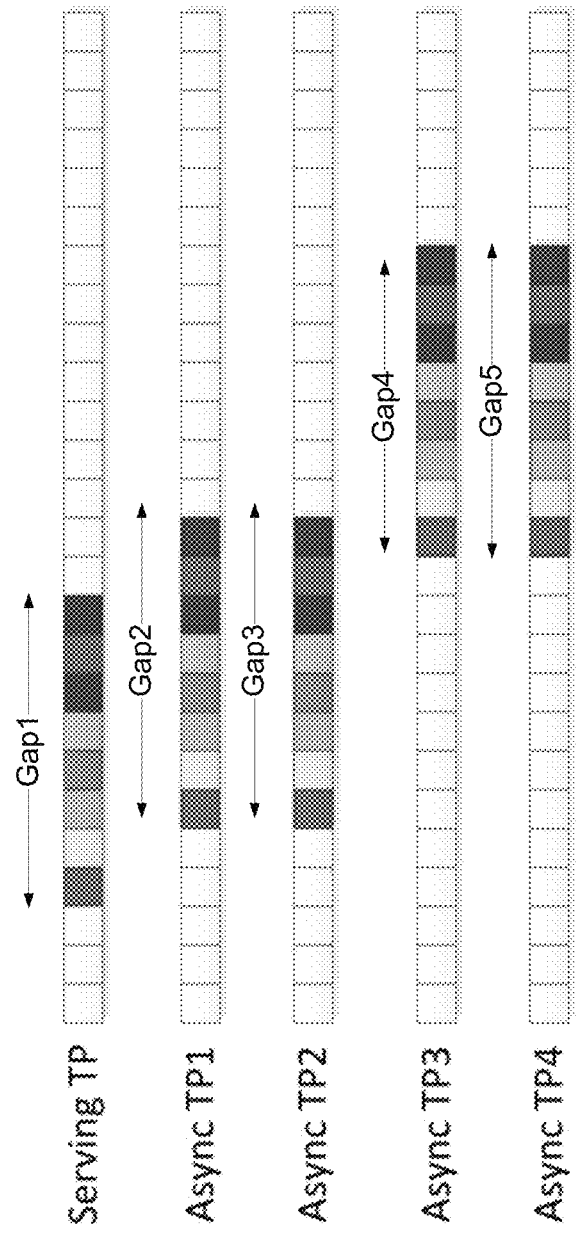
FIGS. 3-6 are examples of measurement gap configurations in accordance with various examples discussed herein.
Figure 4:
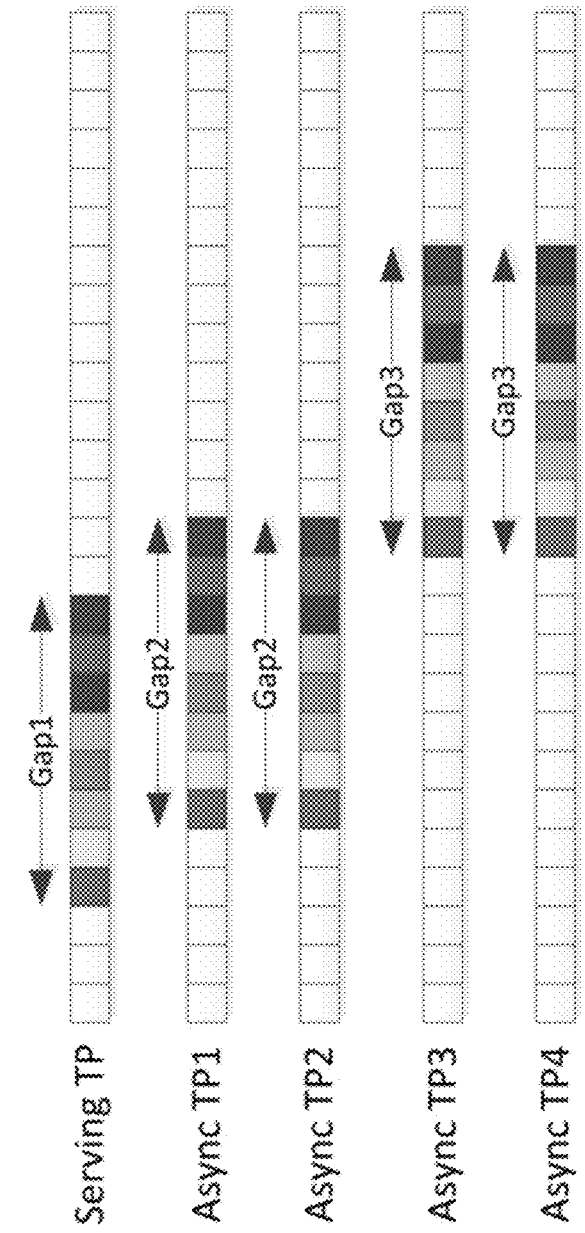

Referring to FIG. 3, in some examples the eNB may configure a separate measurement gap for each of the transmission points (TPs) in the network. In the example depicted in FIG. 3 each transmission point (TP) utilizes eight different beams for beamforming, illustrated by the different shades, and the respective measurement blocks are defined to correspond to one transmission block for each of the eight different beams. The respective measurement gaps may, but need not, overlap.

In some examples the eNB may assign different measurement gaps to groups transmission points (TPs). In the example depicted in FIG. 4 the serving TP is assigned a first measurement gap, TP1 and TP2 are assigned a second measurement gap, and TP3 and TP4 are assigned a third measurement gap. In total, three separate measurement gaps are configured.

Figure 5:
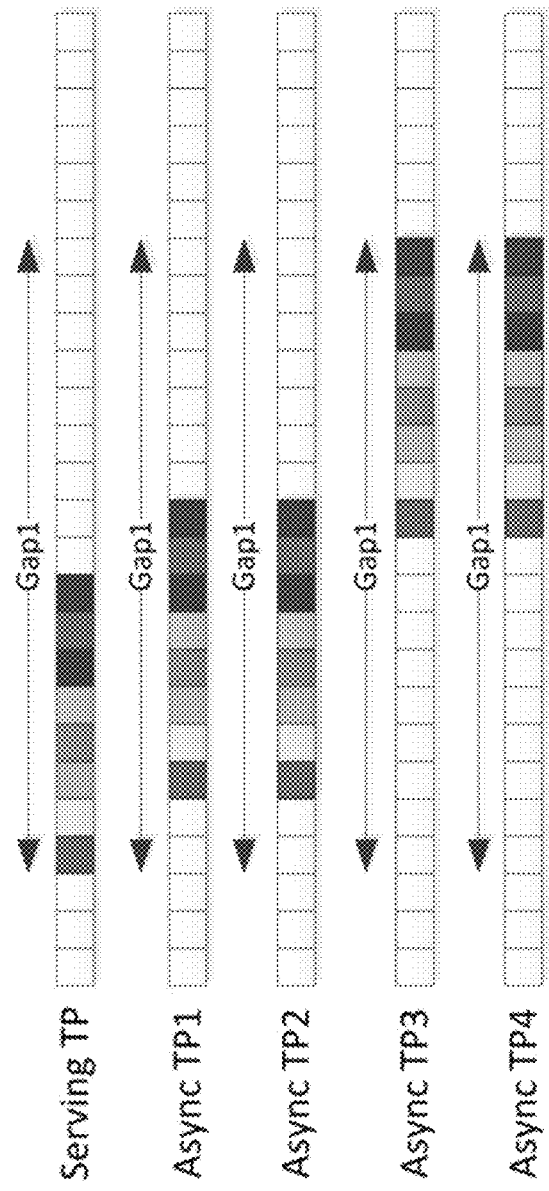

Referring to FIG. 5, in some examples the eNB may configure a single measurement gap of sufficient length to accommodate all transmission points, without regard to whether the transmission points are operating in a synchronous fashion or an asynchronous fashion.

Figure 6:
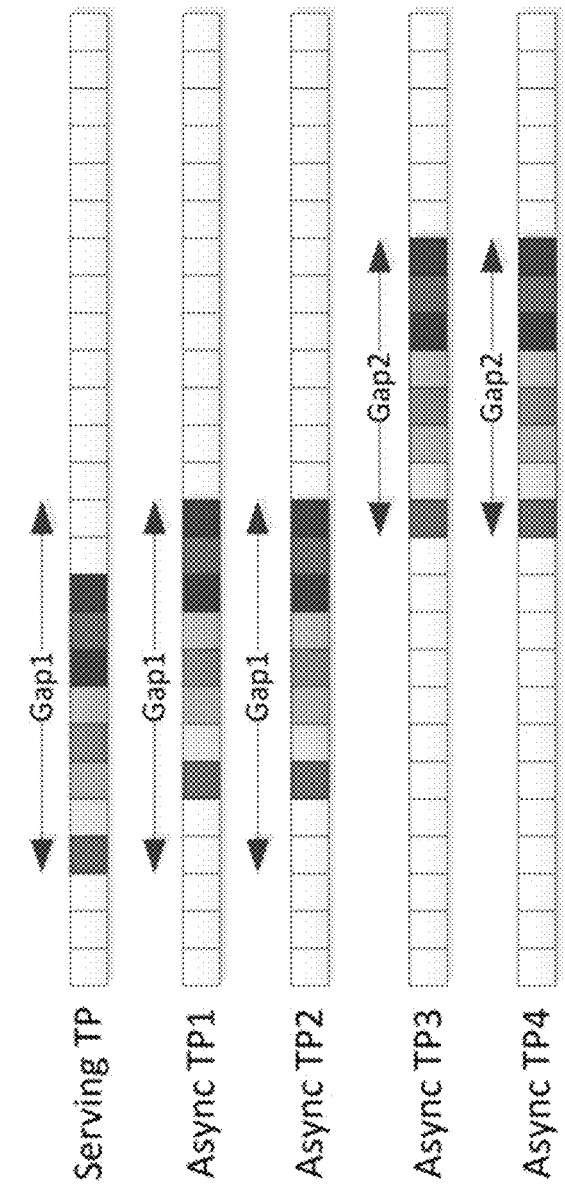

Referring to FIG. 6, in some examples the eNB may configure a first measurement gap of sufficient length to accommodate the serving TP and TP1 and TP2 and a second measurement gap of sufficient length to accommodate TP3 and TP4.

Figure 7A:
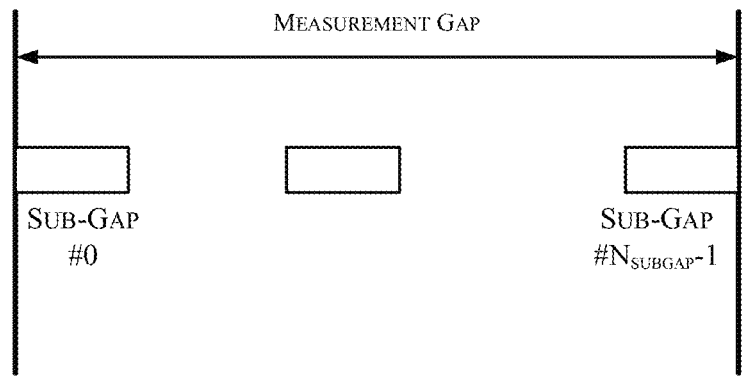
FIGS. 7A-7c are examples of measurement gap configurations in accordance with various examples discussed herein.

Referring to FIG. 7A, in some examples the eNB may configure a hierarchical measurement gap in which a plurality of sub-gaps measurements for different transmission points (TPs) are embedded in such a manner that the sub-gap measurements are equally spaced throughout the measurement gap.

In some examples the number of sub-gaps within the measurement gap may be configured by higher-layer signaling, e.g., radio resource control (RRC) signaling using a MeasGapConfig interface of an RRC Connection Reconfiguration message. In some embodiments, the eNB can configure the sub-gaps such that they are associated with one or more beam-specific measurements, e.g., a beam reference signal identifier (BRS-ID). In such embodiments the BRS-ID for each transmit beam may included in the measurement report to enable the UE to utilize different Rx beams to measure link quality during different sub-gaps.

Figure 7B:
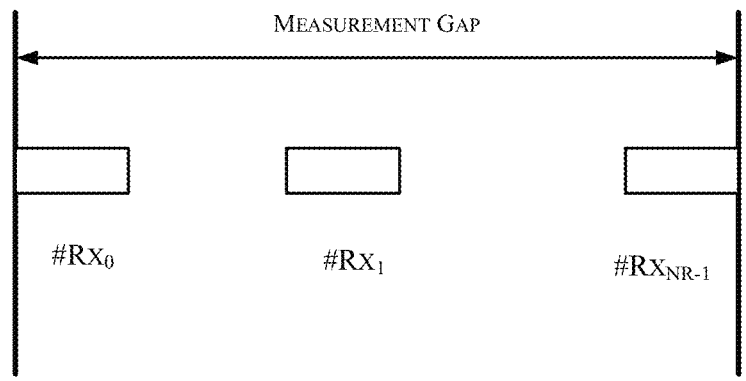

Referring to FIG. 7B, in another example the UE can perform beam-specific measurements during the sub-gaps. For example, in a measurement gap which includes a number, N, sub-gaps which are associated with specific reference beams a UE may evaluate the respective receive beams ($Rx_0$, $Rx_1$ ... $Rx_{NR-1}$) during the sub-gaps for each respective beam. The duration of each sub-gap may be configured by the eNB through higher layer signaling such that it covers the timing offset of different transmission points (TPs).

Figure 7C:
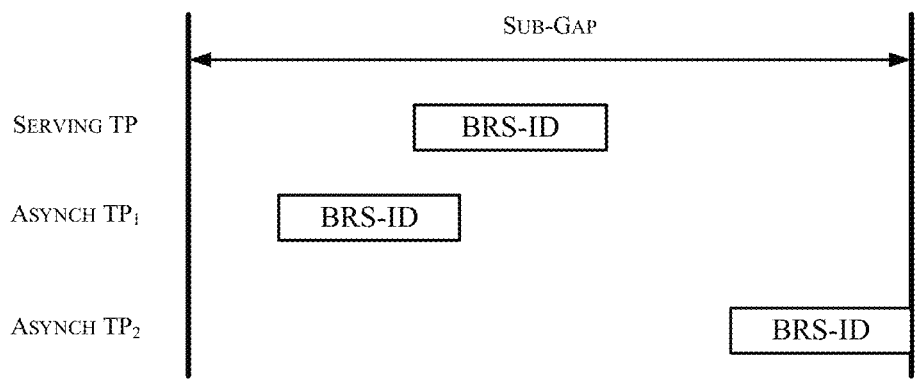

Referring to FIG. 7C, in some examples the beam reference signal identifier (BRS-ID) may be added into the measurement report. A UE may utilize the BRS-IDs to enable contention-free initial access to the respective transmission points (TPs).

In another example the eNB may transmit the a timing offset associated with one or more transmission points (TPs) to the UE FIG. 8 is a depiction of a MeasGapConfig information element that includes a timing offset parameter (TP_ID) and a gap offset parameter (gapOffset) where a value of gp0 corresponds to gap offset of Gap Pattern Id "0" with MGRP=40 ms, and a gapOffset of gp1 corresponds to gap offset of Gap Pattern Id "1" with MGRP=80 ms.

Figure 9:
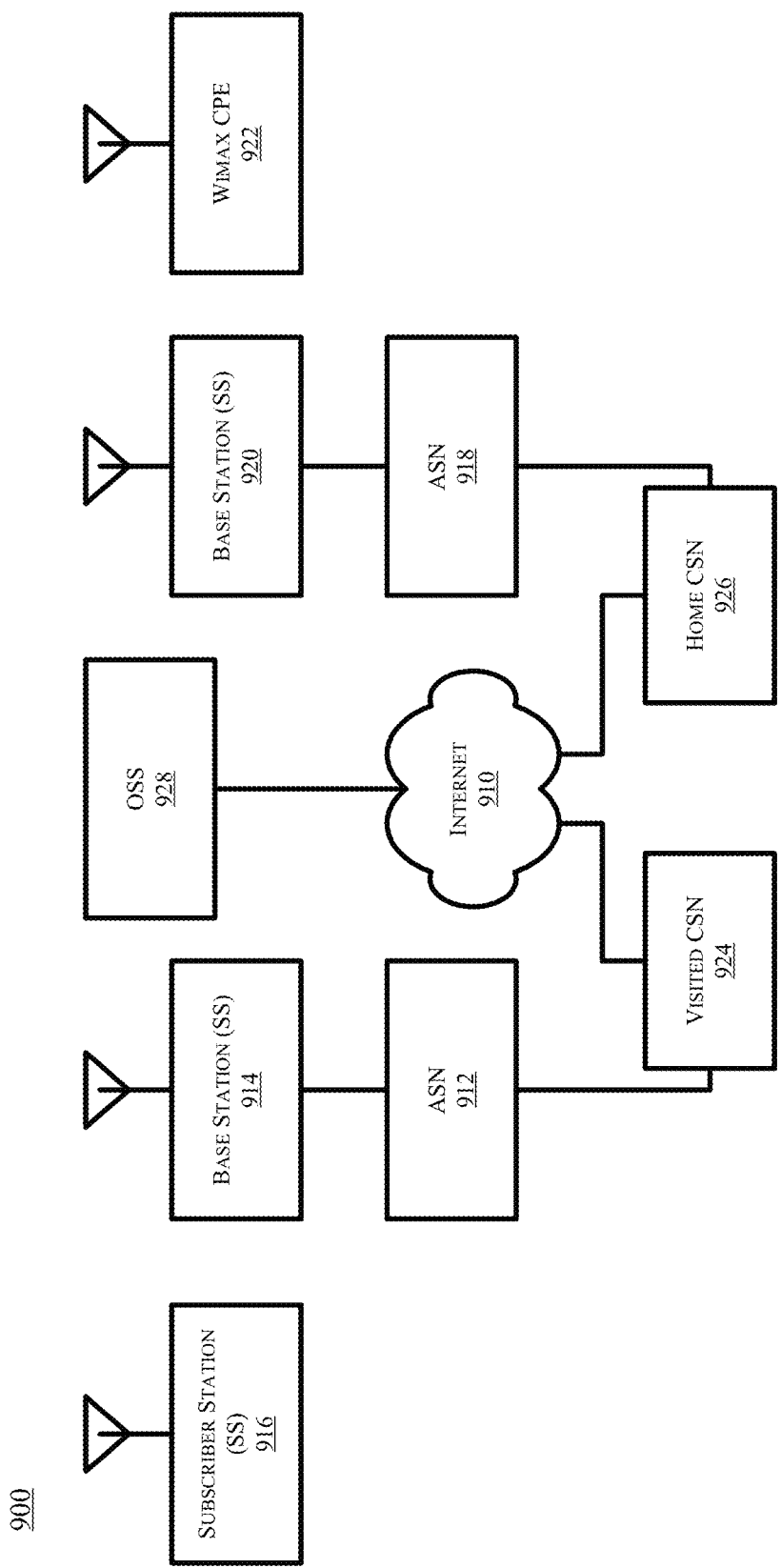
FIG. 9 is a schematic, block diagram illustration of a wireless network in accordance with one or more exemplary embodiments disclosed herein.

FIG. 9 is a schematic, block diagram illustration of a wireless network 900 in accordance with one or more exemplary embodiments disclosed herein. One or more of the elements of wireless network 900 may be capable of implementing methods to identify victims and aggressors according to the subject matter disclosed herein. As shown in FIG. 9, network 900 may be an Internet-Protocol-type (IP-type) network comprising an Internet-type network 910, or the like, that is capable of supporting mobile wireless access and/or fixed wireless access to Internet 910.

In one or more examples, network 900 may operate in compliance with a Worldwide Interoperability for Microwave Access (WiMAX) standard or future generations of WiMAX, and in one particular example may be in compliance with an Institute for Electrical and Electronics Engineers 802.16-based standard (for example, IEEE 802.16e), or an IEEE 802.11-based standard (for example, IEEE 802.11 a/b/g/n standard), and so on. In one or more alternative examples, network 900 may be in compliance with a 3rd Generation Partnership Project Long Term Evolution (3GPP LTE), a 3GPP2 Air Interface Evolution (3GPP2 AIE) standard and/or a 3GPP LTE-Advanced standard. In general, network 900 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4th Generation (4G) type network, and so on, and the scope of the claimed subject matter is not limited in these respects.

As an example of mobile wireless access, access service network (ASN) 912 is capable of coupling with base station (BS) 914 to provide wireless communication between subscriber station (SS) 916 (also referred to herein as a wireless terminal) and Internet 910. In one example, subscriber station 916 may comprise a mobile-type device or information-handling system capable of wirelessly communicating via network 900, for example, a notebook-type computer, a cellular telephone, a personal digital assistant, an M2M-type device, or the like. In another example, subscriber station is capable of providing an uplink-transmit-power control technique that reduces interference experienced at other wireless devices according to the subject matter disclosed herein. ASN 912 may implement profiles that are capable of defining the mapping of network functions to one or more physical entities on network 900. Base station 914 may comprise radio equipment to provide radio-frequency (RF) communication with subscriber station 916, and may comprise, for example, the physical layer (PHY) and media access control (MAC) layer equipment in compliance with an IEEE 802.16e-type standard. Base station 914 may further comprise an IP backplane to couple to Internet 910 via ASN 912, although the scope of the claimed subject matter is not limited in these respects.

Network 900 may further comprise a visited connectivity service network (CSN) 924 capable of providing one or more network functions including, but not limited to, proxy and/or relay type functions, for example, authentication, authorization and accounting (AAA) functions, dynamic host configuration protocol (DHCP) functions, or domain-name service controls or the like, domain gateways, such as public switched telephone network (PSTN) gateways or Voice over Internet Protocol (VoIP) gateways, and/or Internet-Protocol-type (IP-type) server functions, or the like. These are, however, merely example of the types of functions that are capable of being provided by visited CSN or home CSN 926, and the scope of the claimed subject matter is not limited in these respects.

Visited CSN 924 may be referred to as a visited CSN in the case, for example, in which visited CSN 924 is not part of the regular service provider of subscriber station 916, for example, in which subscriber station 916 is roaming away from its home CSN, such as home CSN 926, or, for example, in which network 900 is part of the regular service provider of subscriber station, but in which network 900 may be in another location or state that is not the main or home location of subscriber station 916.

In a fixed wireless arrangement, WiMAX-type customer premises equipment (CPE) 922 may be located in a home or business to provide home or business customer broadband access to Internet 910 via base station 920, ASN 918, and home CSN 926 in a manner similar to access by subscriber station 916 via base station 914, ASN 912, and visited CSN 924, a difference being that WiMAX CPE 922 is generally disposed in a stationary location, although it may be moved to different locations as needed, whereas subscriber station may be utilized at one or more locations if subscriber station 916 is within range of base station 914 for example.

It should be noted that CPE 922 need not necessarily comprise a WiMAX-type terminal, and may comprise other types of terminals or devices compliant with one or more standards or protocols, for example, as discussed herein, and in general may comprise a fixed or a mobile device. Moreover, in one exemplary embodiment, CPE 922 is capable of providing an uplink-transmit-power control technique that reduces interference experienced at other wireless devices according to the subject matter disclosed herein.

In accordance with one or more examples, operation support system (OSS) 928 may be part of network 900 to provide management functions for network 900 and to provide interfaces between functional entities of network 900. Network 900 of FIG. 9 is merely one type of wireless network showing a certain number of the components of network 900; however, the scope of the claimed subject matter is not limited in these respects.

Figure 10:
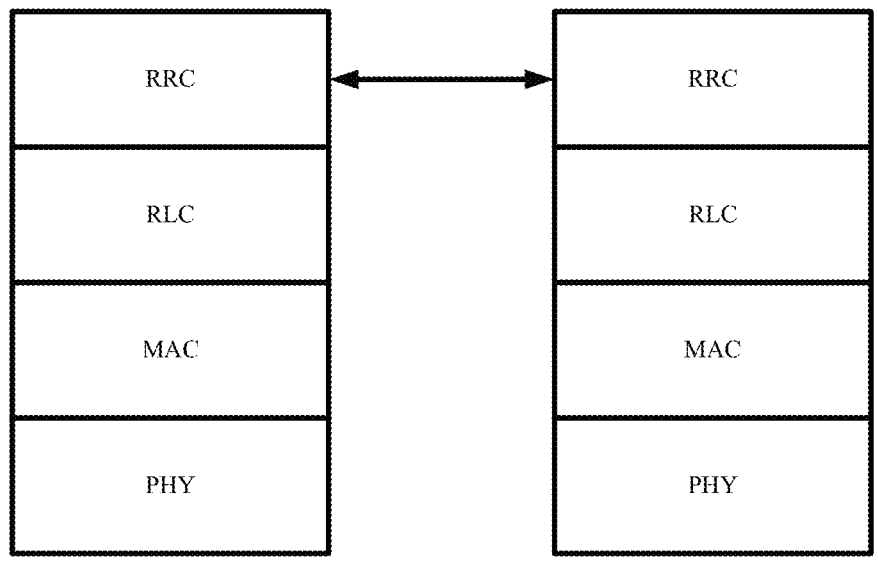
FIGS. 10 and 11 are schematic, block diagram illustrations, respectively, of radio interface protocol structures between a UE and an eNodeB based on a 3GPP-type radio access network standard in accordance with one or more exemplary embodiments disclosed herein.
Figure 11:
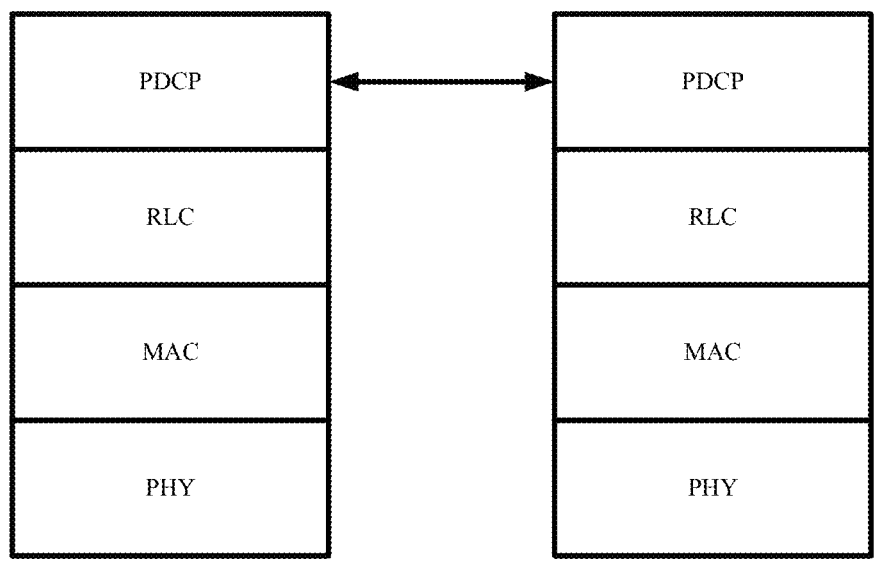

FIGS. 10 and 11 respectively depict exemplary radio interface protocol structures between a UE and an eNodeB that are based on a 3GPP-type radio access network standard and that is capable of providing an uplink-transmit-power control technique that reduces interference experienced at other wireless devices according to the subject matter disclosed herein. More specifically, FIG. 10 depicts individual layers of a radio protocol control plane and FIG. 11 depicts individual layers of a radio protocol user plane. The protocol layers of FIGS. 10 and 11 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB).

The SRB is used as a transmission passage of RRC messages in the C plane, and the DRB is used as a transmission passage of user data in the U plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 12:
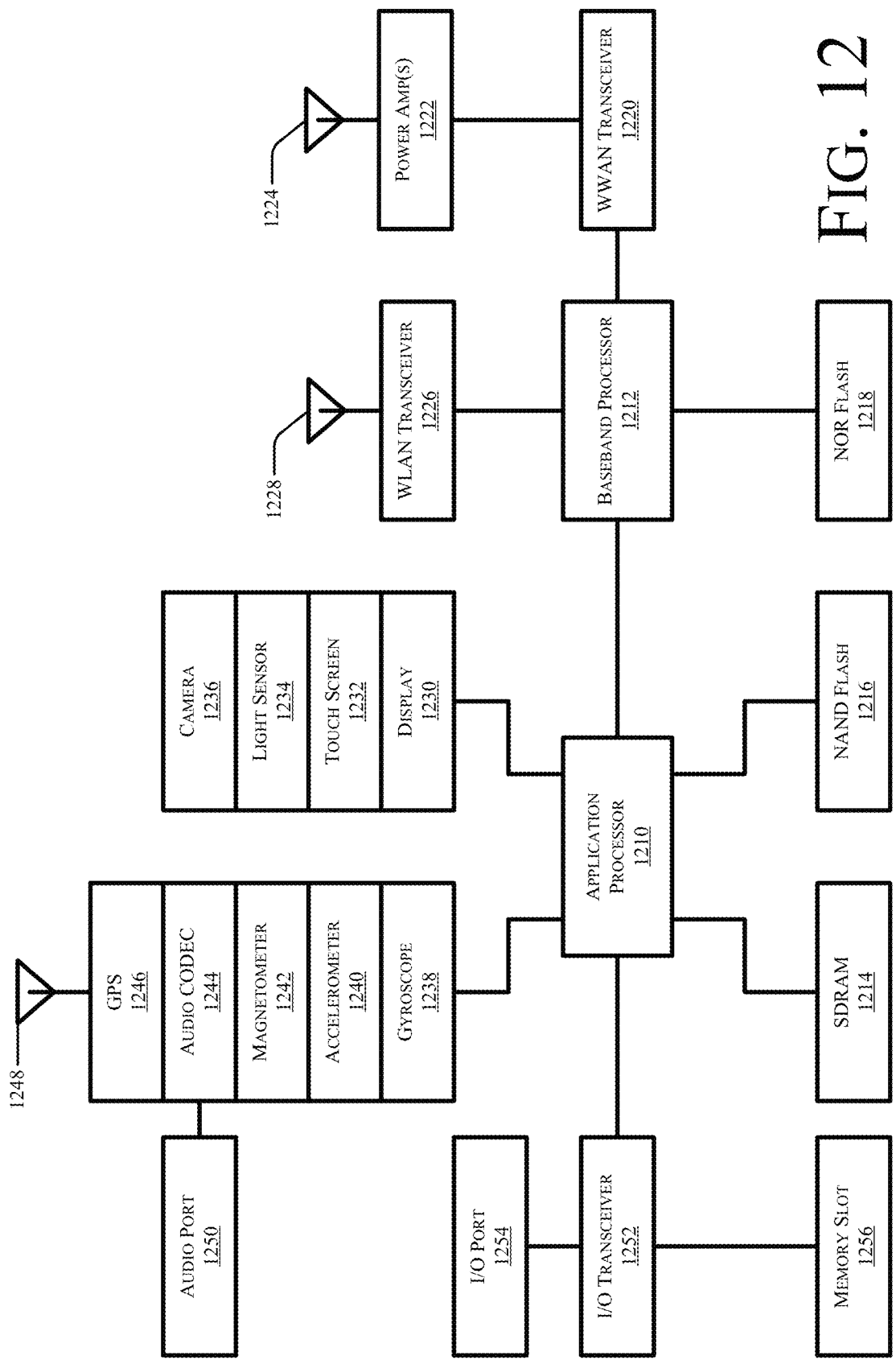
FIG. 12 is a schematic, block diagram illustration of an information-handling system in accordance with one or more exemplary embodiments disclosed herein.

FIG. 12 depicts an exemplary functional block diagram of an information-handling system 1200 that is capable of implementing methods to identify victims and aggressors according to the subject matter disclosed herein. Information handling system 1200 of FIG. 12 may tangibly embody one or more of any of the exemplary devices, exemplary network elements and/or functional entities of the network as shown in and described herein. In one example, information-handling system 1200 may represent the components of a UE 111 or eNB 110, and/or a WLAN access point 120, with greater or fewer components depending on the hardware specifications of the particular device or network element. In another example, information-handling system may provide M2M-type device capability. In yet another exemplary embodiment, information-handling system 1200 is capable of providing an uplink-transmit-power control technique that reduces interference experienced at other wireless devices according to the subject matter disclosed herein. Although information-handling system 1200 represents one example of several types of computing platforms, information-handling system 1200 may include more or fewer elements and/or different arrangements of elements than shown in FIG. 12, and the scope of the claimed subject matter is not limited in these respects.

In one or more examples, information-handling system 1200 may comprise one or more applications processor 1210 and a baseband processor 1212. Applications processor 1210 may be utilized as a general purpose processor to run applications and the various subsystems for information handling system 1200, and to capable of providing an uplink-transmit-power control technique that reduces interference experienced at other wireless devices according to the subject matter disclosed herein. Applications processor 1210 may include a single core or alternatively may include multiple processing cores wherein one or more of the cores may comprise a digital signal processor or digital signal processing core. Furthermore, applications processor 1210 may include a graphics processor or coprocessor disposed on the same chip, or alternatively a graphics processor coupled to applications processor 1210 may comprise a separate, discrete graphics chip. Applications processor 1210 may include on-board memory, such as cache memory, and further may be coupled to external memory devices such as synchronous dynamic random access memory (SDRAM) 1214 for storing and/or executing applications, such as capable of providing an uplink-transmit-power control technique that reduces interference experienced at other wireless devices according to the subject matter disclosed herein. During operation, and NAND flash 1216 for storing applications and/or data even when information handling system 1200 is powered off.

In one example, a list of candidate nodes may be stored in SDRAM 1214 and/or NAND flash 1216. Further, applications processor 1210 may execute computer-readable instructions stored in SDRAM 1214 and/or NAND flash 1216 that result in an uplink-transmit-power control technique that reduces interference experienced at other wireless devices according to the subject matter disclosed herein.

In one example, baseband processor 1212 may control the broadband radio functions for information-handling system 1200. Baseband processor 1212 may store code for controlling such broadband radio functions in a NOR flash 1218. Baseband processor 1212 controls a wireless wide area network (WWAN) transceiver 1220 which is used for modulating and/or demodulating broadband network signals, for example, for communicating via a 3GPP LTE network or the like as discussed herein with respect to FIG. 12. The WWAN transceiver 1220 couples to one or more power amplifiers 1222 that are respectively coupled to one or more antennas 1224 for sending and receiving radio-frequency signals via the WWAN broadband network. The baseband processor 1212 also may control a wireless local area network (WLAN) transceiver 1226 coupled to one or more suitable antennas 1228 and that may be capable of communicating via a Bluetooth-based standard, an IEEE 802.11-based standard, an IEEE 802.16-based standard, an IEEE 802.18-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a 3GPP-LTE-Advanced-based wireless network, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for applications processor 1210 and baseband processor 1212, and the scope of the claimed subject matter is not limited in these respects. For example, any one or more of SDRAM 1214, NAND flash 1216 and/or NOR flash 1218 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 1210 may drive a display 1230 for displaying various information or data, and may further receive touch input from a user via a touch screen 1232, for example, via a finger or a stylus. In one exemplary embodiment, screen 1232 display a menu and/or options to a user that are selectable via a finger and/or a stylus for entering information into information-handling system 1200.

An ambient light sensor 1234 may be utilized to detect an amount of ambient light in which information-handling system 1200 is operating, for example, to control a brightness or contrast value for display 1230 as a function of the intensity of ambient light detected by ambient light sensor 1234. One or more cameras 1236 may be utilized to capture images that are processed by applications processor 1210 and/or at least temporarily stored in NAND flash 1216. Furthermore, applications processor may be coupled to a gyroscope 1238, accelerometer 1240, magnetometer 1242, audio coder/decoder (CODEC) 1244, and/or global positioning system (GPS) controller 1246 coupled to an appropriate GPS antenna 1248, for detection of various environmental properties including location, movement, and/or orientation of information-handling system 1200. Alternatively, controller 1246 may comprise a Global Navigation Satellite System (GNSS) controller. Audio CODEC 1244 may be coupled to one or more audio ports 1250 to provide microphone input and speaker outputs either via internal devices and/or via external devices coupled to information-handling system via the audio ports 1250, for example, via a headphone and microphone jack. In addition, applications processor 1210 may couple to one or more input/output (I/O) transceivers 1252 to couple to one or more I/O ports 1254 such as a universal serial bus (USB) port, a high-definition multimedia interface (HDMI) port, a serial port, and so on. Furthermore, one or more of the I/O transceivers 1252 may couple to one or more memory slots 1256 for optional removable memory, such as secure digital (SD) card or a subscriber identity module (SIM) card, although the scope of the claimed subject matter is not limited in these respects.

Figure 13:
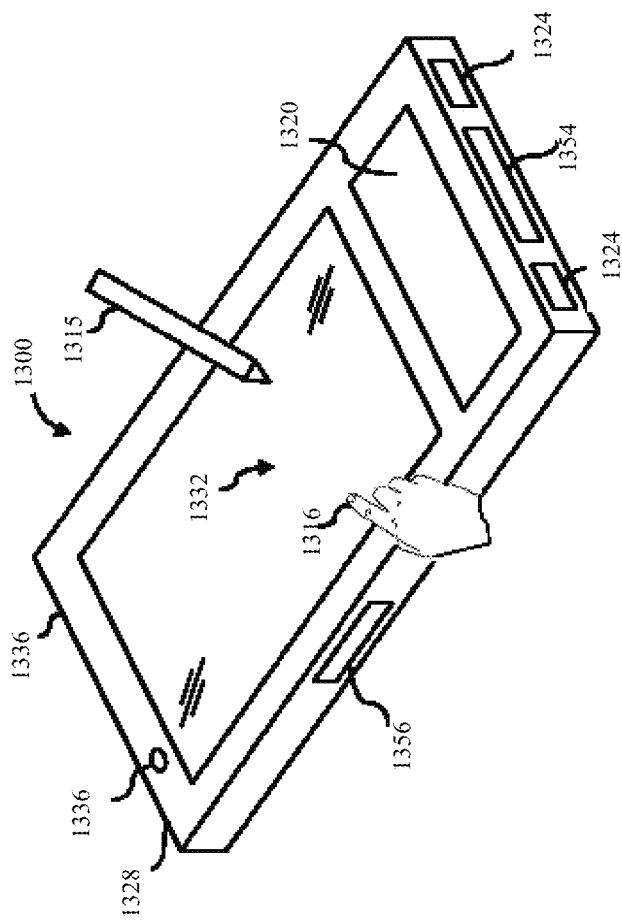
FIG. 13 is an isometric view of an exemplary embodiment of an information-handling system that optionally may include a touch screen in accordance with one or more embodiments disclosed herein.

FIG. 13 depicts an isometric view of an exemplary embodiment of the information-handling system of FIG. 12 that optionally may include a touch screen in accordance with one or more embodiments disclosed herein. FIG. 13 shows an example implementation of an information-handling system 1300 tangibly embodied as a cellular telephone, smartphone, smart-type device, or tablet-type device or the like, that is capable of implementing methods to identify victims and aggressors according to the subject matter disclosed herein. In one or more embodiments, the information-handling system a housing 1310 having a display 1030 that may include a touch screen 1332 for receiving tactile input control and commands via a finger 1316 of a user and/or a via stylus 1318 to control one or more applications processors 1210. The housing 1310 may house one or more components of information-handling system 1000, for example, one or more applications processors 1210, one or more of SDRAM 1214, NAND flash 1216, NOR flash 1218, baseband processor 1212, and/or WWAN transceiver 1220. The information-handling system 1300 further may optionally include a physical actuator area 1320 which may comprise a keyboard or buttons for controlling information-handling system 1000 via one or more buttons or switches. The information-handling system 1000 may also include a memory port or slot 1056 for receiving non-volatile memory, such as flash memory, for example, in the form of a secure digital (SD) card or a subscriber identity module (SIM) card. Optionally, the information-handling system 1000 may further include one or more speakers and/or microphones 1324 and a connection port 1354 for connecting the information-handling system 1300 to another electronic device, dock, display, battery charger, and so on. Additionally, information-handling system 1300 may include a headphone or speaker jack 1328 and one or more cameras 1336 on one or more sides of the housing 1310. It should be noted that the information-handling system 1300 of FIG. 13 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 14:
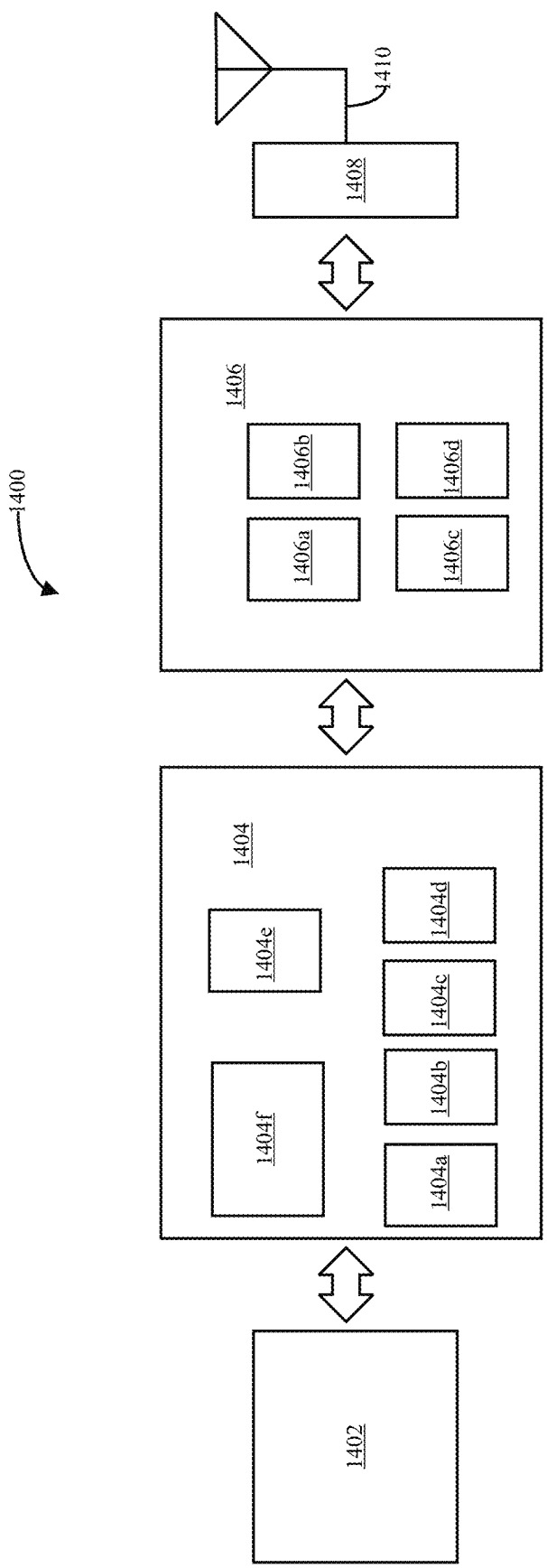
FIG. 14 is a schematic, block diagram illustration of components of a wireless device in accordance with one or more exemplary embodiments disclosed herein.

Embodiments described herein may be implemented into a system using any suitably configured hardware and/or software. FIG. 14 illustrates, for one embodiment, example components of a User Equipment (UE) device 1400. In some embodiments, the UE device 1400 may include application circuitry 1402, baseband circuitry 1404, Radio Frequency (RF) circuitry 1406, front-end module (FEM) circuitry 1408 and one or more antennas 1410, coupled together at least as shown.

The application circuitry 1402 may include one or more application processors. For example, the application circuitry 1402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1404 may include circuitry such as, but not limited to, one or more single-core or multi-core processors. The baseband circuitry 1404 may include one or more baseband processors and/or control logic to process baseband signals received from a receive signal path of the RF circuitry 1406 and to generate baseband signals for a transmit signal path of the RF circuitry 1406. Baseband processing circuitry 1404 may interface with the application circuitry 1402 for generation and processing of the baseband signals and for controlling operations of the RF circuitry 1406. For example, in some embodiments, the baseband circuitry 1404 may include a second generation (2G) baseband processor 1404a, third generation (3G) baseband processor 1404b, fourth generation (4G) baseband processor 1404c, and/or other baseband processor(s) 1404d for other existing generations, generations in development or to be developed in the future (e.g., fifth generation (5G), 6G etc.). The baseband circuitry 1404 (e.g., one or more of baseband processors 1404a-d) may handle various radio control functions that enable communication with one or more radio networks via the RF circuitry 1406. The radio control functions may include, but are not limited to, signal modulation/demodulation, encoding/decoding, radio frequency shifting, etc. In some embodiments, modulation/demodulation circuitry of the baseband circuitry 1404 may include Fast-Fourier Transform (FFT), precoding, and/or constellation mapping/demapping functionality. In some embodiments, encoding/decoding circuitry of the baseband circuitry 1404 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1404 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1404e of the baseband circuitry 1404 may be configured to run elements of the protocol stack for signaling of the PHY, MAC, RLC, PDCP and/or RRC layers. In some embodiments, the baseband circuitry may include one or more audio digital signal processor(s) (DSP) 1404f. The audio DSP(s) 1404f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1404 and the application circuitry 1402 may be implemented together such as, for example, on a system on a chip (SOC).

In some embodiments, the baseband circuitry 1404 may provide for communication compatible with one or more radio technologies. For example, in some embodiments, the baseband circuitry 1404 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1404 is configured to support radio communications of more than one wireless protocol may be referred to as multi-mode baseband circuitry.

RF circuitry 1406 may enable communication with wireless networks using modulated electromagnetic radiation through a non-solid medium. In various embodiments, the RF circuitry 1406 may include switches, filters, amplifiers, etc. to facilitate the communication with the wireless network. RF circuitry 1406 may include a receive signal path which may include circuitry to down-convert RF signals received from the FEM circuitry 1408 and provide baseband signals to the baseband circuitry 1404. RF circuitry 1406 may also include a transmit signal path which may include circuitry to up-convert baseband signals provided by the baseband circuitry 1404 and provide RF output signals to the FEM circuitry 1408 for transmission.

In some embodiments, the RF circuitry 1406 may include a receive signal path and a transmit signal path. The receive signal path of the RF circuitry 1406 may include mixer circuitry 1406a, amplifier circuitry 1406b and filter circuitry 1406c. The transmit signal path of the RF circuitry 1406 may include filter circuitry 1406c and mixer circuitry 1406a. RF circuitry 1406 may also include synthesizer circuitry 1406d for synthesizing a frequency for use by the mixer circuitry 1406a of the receive signal path and the transmit signal path. In some embodiments, the mixer circuitry 1406a of the receive signal path may be configured to down-convert RF signals received from the FEM circuitry 1408 based on the synthesized frequency provided by synthesizer circuitry 1406d. The amplifier circuitry 1406b may be configured to amplify the down-converted signals and the filter circuitry 1406c may be a low-pass filter (LPF) or band-pass filter (BPF) configured to remove unwanted signals from the down-converted signals to generate output baseband signals. Output baseband signals may be provided to the baseband circuitry 1404 for further processing. In some embodiments, the output baseband signals may be zero-frequency baseband signals, although this is not a requirement. In some embodiments, mixer circuitry 1406a of the receive signal path may comprise passive mixers, although the scope of the embodiments is not limited in this respect.

In some embodiments, the mixer circuitry 1406a of the transmit signal path may be configured to up-convert input baseband signals based on the synthesized frequency provided by the synthesizer circuitry 1406d to generate RF output signals for the FEM circuitry 1408. The baseband signals may be provided by the baseband circuitry 1404 and may be filtered by filter circuitry 1406c. The filter circuitry 1406c may include a low-pass filter (LPF), although the scope of the embodiments is not limited in this respect.

In some embodiments, the mixer circuitry 1406a of the receive signal path and the mixer circuitry 1406a of the transmit signal path may include two or more mixers and may be arranged for quadrature downconversion and/or upconversion respectively. In some embodiments, the mixer circuitry 1406a of the receive signal path and the mixer circuitry 1406a of the transmit signal path may include two or more mixers and may be arranged for image rejection (e.g., Hartley image rejection). In some embodiments, the mixer circuitry 1406a of the receive signal path and the mixer circuitry 1406a may be arranged for direct downconversion and/or direct upconversion, respectively. In some embodiments, the mixer circuitry 1406a of the receive signal path and the mixer circuitry 1406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1406 may include analog-to-digital converter (ADC) and digital-to-analog converter (DAC) circuitry and the baseband circuitry 1404 may include a digital baseband interface to communicate with the RF circuitry 1406.

In some dual-mode embodiments, a separate radio IC circuitry may be provided for processing signals for each spectrum, although the scope of the embodiments is not limited in this respect.

In some embodiments, the synthesizer circuitry 1406d may be a fractional-N synthesizer or a fractional N/N+1 synthesizer, although the scope of the embodiments is not limited in this respect as other types of frequency synthesizers may be suitable. For example, synthesizer circuitry 1406d may be a delta-sigma synthesizer, a frequency multiplier, or a synthesizer comprising a phase-locked loop with a frequency divider.

The synthesizer circuitry 1406d may be configured to synthesize an output frequency for use by the mixer circuitry 1406a of the RF circuitry 1406 based on a frequency input and a divider control input. In some embodiments, the synthesizer circuitry 1406d may be a fractional N/N+1 synthesizer.

In some embodiments, frequency input may be provided by a voltage controlled oscillator (VCO), although that is not a requirement. Divider control input may be provided by either the baseband circuitry 1404 or the applications processor 1402 depending on the desired output frequency. In some embodiments, a divider control input (e.g., N) may be determined from a look-up table based on a channel indicated by the applications processor 1402.

Synthesizer circuitry 1406d of the RF circuitry 1406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1406 may include an IQ/polar converter.

FEM circuitry 1408 may include a receive signal path which may include circuitry configured to operate on RF signals received from one or more antennas 1410, amplify the received signals and provide the amplified versions of the received signals to the RF circuitry 1406 for further processing. FEM circuitry 1408 may also include a transmit signal path which may include circuitry configured to amplify signals for transmission provided by the RF circuitry 1406 for transmission by one or more of the one or more antennas 1410.

In some embodiments, the FEM circuitry 1408 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1406). The transmit signal path of the FEM circuitry 1408 may include a power amplifier (PA) to amplify input RF signals (e.g., provided by RF circuitry 1406), and one or more filters to generate RF signals for subsequent transmission (e.g., by one or more of the one or more antennas 1410.

In some embodiments, the UE device 1400 may include additional elements such as, for example, memory/storage, display, camera, sensor, and/or input/output (I/O) interface.

The following pertains to further examples.

Example 1 is an apparatus of an evolved NodeB (eNB) comprising baseband circuitry including one or more processors to configure, via a MeasGapConfig information element (IE) of a radio resource control (RRC) Connection Reconfiguration message, a measurement gap for intra-frequency measurement in a communication channel between at least one of a plurality of transmission points (TPs) of a communication network and a user equipment (UE); and generate an instruction to cease transmission and reception by the eNB for a predetermined period of time during the measurement gap.

In example 2, the subject matter of example 1 can further comprise an arrangement wherein the one or more processors configures the plurality of transmission points (TPs) to operate in a synchronous fashion and the eNB configures the plurality of TPs to share a single measurement gap time slot.

In example 3, the subject matter of any one of examples 1-2 can comprise an arrangement wherein the one or more processors configures the plurality of transmission points (TPs) to operate in an asynchronous fashion and the eNB configures the plurality of TPs to utilize measurement gaps which reside in different time slots.

In example 4, the subject matter of any one of examples 3-4, can comprise an arrangement wherein the one or more processors of the baseband circuitry is configured to configure a combined measurement gap which is of sufficient duration to accommodate both synchronous and asynchronous transmission points (TPs) for a UE to perform downlink (Rx) measurements from the TPs.

In example 5, the subject matter of any one of examples 1-4, can comprise an arrangement wherein the one or more processors configure a measurement gap of sufficient duration to accommodate both synchronous and asynchronous transmission points for a UE to perform downlink (Rx) measurements from all of the TPs, wherein the number of sub-gaps, N, is configured by higher layer signaling through the MeasGapConfig-Rxx information element.

In example 6, the subject matter of any one of examples 1-5, can comprise an arrangement wherein the number, N, of sub-gaps are spread equally in time through the measurement gap.

In example 7, the subject matter of any one of examples 1-6, can comprise an arrangement wherein the sub-gaps are related to a specific transmit beam.

In example 8, the subject matter of any one of examples 1-7, can comprise circuitry to transmit the measurement gap to the plurality of transmission points (TPs).

In example 9, the subject matter of any one of examples 1-8, can comprise an arrangement wherein the eNB transmits the measurement gap to the plurality of transmission points (TPs) using higher layer radio resource control (RRC) signaling.

In example 10, the subject matter of any one of examples 1-9, can comprise transmit circuitry to transmit a plurality of transmit beams, wherein each transmit beam is associated with a beam reference signal identifier (BRS-ID).

In example 11, the subject matter of any one of examples 1-10, can comprise an arrangement wherein the one or more processors are configured to include the BRS-ID in a measurement report.

Example 12 is a machine-readable medium comprising instructions which, when executed by a processor of an evolved NodeB (eNB) in a communication network comprising a plurality of transmission points (TPs), configure the processor to configure, via a MeasGapConfig information element (IE) of a radio resource control (RRC) Connection Reconfiguration message, a measurement gap for intra-frequency measurement in a communication channel between at least one of a plurality of transmission points (TPs) of a communication network and a user equipment (UE) and generate an instruction to cease transmission and reception by the eNB for a predetermined period of time during the measurement gap.

In example 13, the subject matter of example 12 can further comprise an arrangement wherein the instructions configure the plurality of transmission points (TPs) to operate in a synchronous fashion and the eNB configures the plurality of TPs to share a single measurement gap time slot.

In example 15, the subject matter of any one of examples 13-14, can comprise an arrangement wherein the instructions configure the processor to configure a combined measurement gap which is of sufficient duration to accommodate both synchronous and asynchronous transmission points (TPs) for a UE to perform downlink (Rx) measurements from the TPs.

In example 16, the subject matter of any one of examples 12-15, can comprise an arrangement wherein the logic instructions configure the processor to configure a measurement gap of sufficient duration to accommodate both synchronous and asynchronous transmission points for a UE to perform downlink (Rx) measurements from all of the TPs, wherein the number of sub-gaps, N, is configured by higher layer signaling through the MeasGapConfig-Rxx information element.

In example 17, the subject matter of any one of examples 12-16, can comprise an arrangement wherein the number, N, of sub-gaps are spread equally in time through the measurement gap.

In example 18, the subject matter of any one of examples 12-17, can comprise an arrangement wherein the sub-gaps are related to a specific transmit beam.

In example 19, the subject matter of any one of examples 12-18, can comprise an arrangement wherein the instructions configure the processor to transmit the measurement gap to the plurality of transmission points (TPs).

In example 20, the subject matter of any one of examples 12-19, can comprise an arrangement wherein the eNB transmits the measurement gap to the plurality of transmission points (TPs) using higher layer radio resource control (RRC) signaling.

In example 21, the subject matter of any one of examples 12-20, can comprise an arrangement wherein the instructions configure the processor to transmit a plurality of transmit beams, wherein each transmit beam is associated with a beam reference signal identifier (BRS-ID).

In example 22, the subject matter of any one of examples 12-21, can comprise an arrangement wherein the instructions configure the processor to include the BRS-ID in a measurement report.

Example 23 is an apparatus of an evolved NodeB (eNB) in a communication network comprising means to configure, via a MeasGapConfig information element (IE) of a radio resource control (RRC) Connection Reconfiguration message, a measurement gap for intra-frequency measurement in a communication channel between at least one of a plurality of transmission points (TPs) of a communication network and a user equipment (UE); and means to generate an instruction to cease transmission and reception by the eNB for a predetermined period of time during the measurement gap.

In example 24, the subject matter of example 23 can further comprise means to configure the plurality of transmission points (TPs) to operate in a synchronous fashion and the eNB configures the plurality of TPs to share a single measurement gap time slot.

In example 25, the subject matter of any one of examples 23-24 can comprise means to configure the plurality of transmission points (TPs) to operate in an asynchronous fashion and the eNB configures the plurality of TPs to utilize measurement gaps which reside in different time slots.

In example 26, the subject matter of any one of examples 23-25 can comprise means to configure a combined measurement gap which is of sufficient duration to accommodate both synchronous and asynchronous transmission points (TPs) for a UE to perform downlink (Rx) measurements from the TPs.

In example 27, the subject matter of any one of examples 23-26 can comprise means to configure a measurement gap of sufficient duration to accommodate both synchronous and asynchronous transmission points for a UE to perform downlink (Rx) measurements from all of the TPs, wherein the number of sub-gaps, N, is configured by higher layer signaling through the MeasGapConfig-Rxx information element.

In example 28, the subject matter of any one of examples 23-27 can comprise an arrangement wherein the number, N, of sub-gaps are spread equally in time through the measurement gap.

In example 29, the subject matter of any one of examples 23-28 can comprise wherein the sub-gaps are related to a specific transmit beam.

In example 30, the subject matter of any one of examples 23-29 can comprise means to transmit the measurement gap to the plurality of transmission points (TPs).

In example 31, the subject matter of any one of examples 23-30 can comprise means to configure the eNB to transmit the measurement gap to the plurality of transmission points (TPs) using higher layer radio resource control (RRC) signaling.

In example 32, the subject matter of any one of examples 23-31 can comprise means to transmit a plurality of transmit beams, wherein each transmit beam is associated with a beam reference signal identifier (BRS-ID).

In example 33, the subject matter of any one of examples 23-32 can comprise means to include the BRS-ID in a measurement report.

In various examples, the operations discussed herein may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one example" or "an example" means that a particular feature, structure, or characteristic described in connection with the example may be included in at least an implementation. The appearances of the phrase "in one example" in various places in the specification may or may not be all referring to the same example.

Also, in the description and claims, the terms "coupled" and "connected," along with their derivatives, may be used. In some examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus of an evolved NodeB (eNB) comprising baseband circuitry including one or more processors to:
configure, via a MeasGapConfig information element (IE) of a radio resource control (RRC) Connection Reconfiguration message, a first measurement gap and a second measurement gap for intra-frequency measurement in a communication channel between at least two of a plurality of transmission points (TPs) of a communication network and a user equipment (UE), wherein the MeasGapConfig IE indicates a gap offset parameter (gapOffset) comprising a gap pattern identifier (ID) and a measurement gap repetition period (MGRP), and wherein the first measurement gap of a first length is assigned to a first group of asynchronous transmission points and the second measurement gap of a second length is assigned to a second group of asynchronous transmission points, and the first length is different than the second length, wherein the first measurement gap is of sufficient duration to accommodate both synchronous and asynchronous transmission points (TPs) for the UE to perform downlink (Rx) measurements from the plurality of TPs in a single first measurement gap, wherein a number of sub-gaps, N, is configured by higher layer signaling through a MeasGapConfig-Rxx information element; and
generate an instruction to cease transmission and reception by the eNB for a predetermined period of time during the first measurement gap and the second measurement gap.

2. The apparatus of an eNB of claim 1, wherein the one or more processors configures the plurality of transmission points (TPs) to operate in a synchronous fashion and the eNB configures the plurality of TPs to share a single measurement gap time slot.

3. The apparatus of an eNB of claim 1, wherein the one or more processors configures the plurality of transmission points (TPs) to operate in an asynchronous fashion and the eNB configures the plurality of TPs to utilize measurement gaps which reside in different time slots.

4. The apparatus of an eNB of claim 1, wherein the number, N, of sub-gaps are spread equally in time through the first measurement gap.

5. The apparatus of an eNB of claim 1, wherein the sub-gaps are related to a specific transmit beam.

6. The apparatus of an eNB of claim 1, further comprising circuitry to transmit the first measurement gap and the second measurement gap to the plurality of transmission points (TPs).

7. The apparatus of an eNB of claim 6, wherein the eNB transmits the first measurement gap and the second measurement gap to the plurality of transmission points (TPs) using higher layer radio resource control (RRC) signaling.

8. The apparatus of an eNB of claim 1, further comprising transmit circuitry to transmit a plurality of transmit beams, wherein each transmit beam is associated with a beam reference signal identifier (BRS-ID).

9. The apparatus of an eNB of claim 8, wherein the one or more processors are configured to include the BRS-ID in a measurement report.

10. A non-transitory machine-readable medium comprising instructions which, when executed by a processor of an evolved NodeB (eNB) in a communication network comprising a plurality of transmission points (TPs), configure the processor to:
configure, via a MeasGapConfig information element (IE) of a radio resource control (RRC) Connection Reconfiguration message, a first measurement gap and a second measurement gap for intra-frequency measurement in a communication channel between at least two of a plurality of transmission points (TPs) of a communication network and a user equipment (UE), wherein the MeasGapConfig IE indicates a gap offset parameter (gapOffset) comprising a gap pattern identifier (ID) and a measurement gap repetition period (MGRP), and wherein the first measurement gap of a first length is assigned to a first group of asynchronous transmission points and the second measurement gap of a second length is assigned to a second group of asynchronous transmission points, and the first length is different than the second length, wherein the first measurement gap is of sufficient duration to accommodate both synchronous and asynchronous transmission points (TPs) for the UE to perform downlink (Rx) measurements from the plurality of TPs in a single first measurement gap, wherein the number of sub-gaps, N, is configured by higher layer signaling through the MeasGapConfig-Rxx information element; and
generate an instruction to cease transmission and reception by the eNB for a predetermined period of time during the first measurement gap and the second measurement gap.

11. The non-transitory machine-readable medium of claim 10, wherein the logic instructions configure the processor to configure the plurality of transmission points (TPs) to operate in a synchronous fashion and the eNB configures the plurality of TPs to share a single measurement gap time slot.

12. The non-transitory machine-readable medium of claim 10, wherein the logic instructions configure the processor to configure the plurality of transmission points (TPs) to operate in an asynchronous fashion and the eNB configures the plurality of TPs to utilize measurement gaps which reside in different time slots.

13. The non-transitory machine-readable medium of claim 10, wherein the number, N, of sub-gaps are spread equally in time through the first measurement gap.

14. The non-transitory machine-readable medium of claim 10, wherein the sub-gaps are related to a specific transmit beam.

15. The non-transitory machine-readable medium of claim 10, wherein the instructions configure the processor to transmit the first measurement gap and the second measurement gap to the plurality of transmission points (TPs).

16. The non-transitory machine-readable medium of claim 15, wherein the instructions configure the processor to configure the eNB to transmit the first measurement gap and the second measurement gap to the plurality of transmission points (TPs) using higher layer radio resource control (RRC) signaling.

17. The non-transitory machine-readable medium of claim 10, wherein the instructions configure the processor to transmit a plurality of transmit beams, wherein each transmit beam is associated with a beam reference signal identifier (BRS-ID).

18. The machine-readable medium of claim 17, wherein the instructions configure the processor to include the BRS-ID in a measurement report.

\* \* \* \* \*